United States Patent

Lukco et al.

Patent Number: 5,227,249
Date of Patent: Jul. 13, 1993

[54] BORIDE COATINGS FOR SIC REINFORCED TI COMPOSITES

[75] Inventors: D. Lukco, Sagamore Hills; M. A. Tenhover, Solon, both of Ohio

[73] Assignee: Standard Oil Company, Cleveland, Ohio

[21] Appl. No.: 770,689

[22] Filed: Oct. 3, 1991

[51] Int. Cl.$^5$ .............................................. C22C 1/09
[52] U.S. Cl. ................... 428/614; 428/366; 428/367; 428/368; 428/386; 428/388; 428/389; 501/95
[58] Field of Search ............... 428/614, 386, 388, 389, 428/384, 366, 367, 368, 375; 501/95

[56] References Cited

U.S. PATENT DOCUMENTS

| | | |
|---|---|---|
| 3,556,836 | 1/1971 | Basche et al. |
| 3,717,443 | 2/1973 | McMurray et al. |
| 3,811,920 | 5/1974 | Galasso et al. |
| 3,860,443 | 1/1975 | Lachman et al. ................... 428/614 |
| 4,132,828 | 1/1979 | Nakamura et al. ................... 428/366 |
| 4,145,471 | 3/1979 | Kendall et al. ..................... 428/614 |
| 4,867,644 | 9/1989 | Wright et al. ....................... 428/614 |
| 4,962,070 | 10/1990 | Sullivan ................................ 501/95 |
| 4,978,585 | 12/1990 | Ritter et al. ......................... 428/614 |
| 5,059,490 | 10/1991 | Brupbacher et al. ............... 428/614 |

FOREIGN PATENT DOCUMENTS 0298151 1/1989 European Pat. Off. .
0434299 6/1991 European Pat. Off. .

Primary Examiner—Gary P. Straub
Assistant Examiner—Ngoc-Yen M. Nguyen
Attorney, Agent, or Firm—Renner, Kenner, Greive, Bobak, Taylor & Weber

[57] ABSTRACT

The subject invention relates to a coated reinforcement material comprising a SiC reinforcement having an outer core coating of the general formula:

$$Ti_xM_yB_z$$

wherein M is at least one of V, Nb, Ta, Cr, Mo, W, Zr, and Hf; x is between about 30 and 60 atomic percent; y is between about 5 and 30 atomic percent; z is between about 35 and 60 atomic percent; and x+y+z=100. The invention further relates to a high strength, high temperature performance composite comprising a ternary boride coated SiC reinforcement material and titanium alloy matrix material.

26 Claims, 1 Drawing Sheet

BORIDE COATINGS FOR SIC REINFORCED TI COMPOSITES

FIELD OF THE INVENTION

This invention relates to reinforcements for titanium matrix composites that are mechanically and thermally stable. More particularly, this invention relates to coated SiC reinforcements for use in a cubic, or beta, titanium alloy matrix wherein the composition of the coating is a ternary boride.

BACKGROUND OF THE INVENTION

Composite materials of metals and reinforcing silicon carbide fibers potentially possess high toughness levels and good performance characteristics, thereby making them highly suitable for applications which require light-weight structural materials having high elasticity, high strength, shapability, heat stability, electrical conductivity and heat conductivity. These composites are being increasingly investigated for structural applications.

It is known that many fiber-matrix combinations undergo extensive chemical reaction or interdiffusion between the fiber and matrix materials, each of which is likely chosen for the contribution of specific mechanical and/or physical properties to the resulting composite. Such reaction or interdiffusion can lead to serious degradation in strength, toughness and temperature stability. The fiber-matrix interface is therefore very important to preventing or minimizing chemical reactions and interdiffusion.

Surface modification of the fibers is an effective means to control the fiber-matrix interface. This can be accomplished by coating the fibers with a suitable composition to inhibit the fibers from reacting or bonding with the matrix.

A variety of coatings have been proposed for SiC reinforcements intended for use in fiber-matrix composites. U.S. Pat. No. 3,717,443 describes a composite having zirconium coated SiC reinforcing filaments in a titanium or titanium alloy matrix. Zirconium is disclosed as acting as a barrier to interdiffusion of titanium and SiC and prevents weakening of the composite structure.

U.S. Pat. No. 3,556,836 discloses a boron filament having a thin protective layer of SiC and an overcoat of a matrix material including metals such as aluminum, magnesium, titanium, and alloys thereof.

U.S. Pat. No. 3,811,920 discloses the use of silicon carbide surfaced filaments such as filaments of SiC, SiC coated boron and SiC coated carbon which are coated with a thin layer of titanium carbide. These coated filaments are used in metal matrix materials such as titanium and nickel.

U.S. Pat. No. 4,132,828 discloses an assembly of a plurality of carbon fibers incorporated into a metal matrix of Al, Ti, Mg, Zn, Pb, Sn, Ni, Fe, Co, Cu, Ag or Au. The metal matrix containing carbon fibers may also include a layer of titanium or silicon or a carbide or nitride thereof coated on the carbon fibers.

Composite materials containing fibers which are coated to prevent or minimize interdiffusion between the fiber and matrix maerial are often excluded from high temperature applications because of concerns regarding the thermomechanical stability, thermochemical stability, and high temperature fatigue resistance encountered in atmospheric conditions at temperature above 1000° C.

Accordingly, an object of the present invention is to provide a coating for silicon carbide reinforcements which permits the use of the reinforcement in titanium and titanium alloy matrix materials for use at temperatures above 1000° C.

Another object of the invention is to provide a coating for silicon carbide reinforcements which prevents chemical reaction between the fiber and the matrix.

SUMMARY OF THE INVENTION

The subject invention relates to a coated reinforcement material comprising a reinforcement having a coefficient of thermal expansion (CTE) ranging from about $3 \times 10^{-6}/°$ C. to about $12 \times 10^{-6}/°$ C. and having an outer coating of the genearl formula:

$$Ti_xM_yB_z$$

wherein M is at least one of V, Nb, Ta, Cr, Mo, W, Zr and Hf; x is between about 30 and 60 atomic percent; y is between about 5 and 30 atomic percent; z is between about 35 and 60 atomic percent; and $x+y+z=100$. The reinforcement of the present invention may comprise, for example, SiC which has a CTE of about $5 \times 10^{-6}/°$ C. and alumina which has a CTE of about $7 \times 10^{-6}/°$ C.

The coated reinforcement material may further comprise an interface coating selected from the group consisting of carbon and boron nitride interposed between the reinforcement and the outer coating.

The coated reinforcement material may even further comprise an inner boride coating interposed between the outer coating and the interface coating, having the general formula:

$$Ti_aM'_bB_c$$

wherein M' is at least one of Zr and Hf; a is between about 20 and 44 atomic percent; b is between about 0 and 10 atomic percent; c is between about 55 and 90 atomic percent; and $a+b+c=100$.

The subject invention further relates to a high strength, high temperature performance composite comprising a ternary boride coated SiC reinforcement material in which the reinforcement has a coefficient of thermal expansion ranging from about $3 \times 10^{-6}/°$ C. to about $12 \times 10^{-6}/°$ C. and a matrix material, such as a titanium alloy.

DETAILED DESCRIPTION OF THE INVENTION

The subject invention relates to coated silicon carbide reinforcements for use in composite materials, particularly metal matrix composite materials. The ternary boride outer coatings disclosed herein are of the general formula:

$$Ti_xM_yB_z$$

wherein M is at least one of V, Nb, Ta, Cr, Mo, W, Zr and Hf; x is between about 30 and 60 atomic percent; y is between about 5 and 30 atomic percent; z is between about 35 and 60 atomic percent; and x+y+z=100.

The metal matrix material into which the coated SiC reinforcements are incorporated are preferably Ti alloys. Preferably, the metal M of the ternary boride outer coating is also found in the Ti alloy of the matrix into which the coated reinforcement is incorporated. It is further preferred that the metal M of the coating comprise, at least in part, Mo.

The subject coating is compatible with not only the reinforcement to be coated, but also the matrix material into which the coated reinforcement is incorporated to form a composite. The resulting composite is capable of maintaining its strength and high temperature performance at temperatures exceeding 1000° C. for extended periods of time, thus making the composite highly suitable for demanding industrial applications including engine or structural components.

The SiC reinforcement may be in the form of fibers, whiskers or monofilaments, such as the SiC fibers commercially available from DWA Composite Specialties, Inc. Chatsworth, Calif., under the Trademark BP Sigma Fibers. The reinforcement material may further be amorphous, polycrystalline or single crystal in nature. An appropriate reinforcement for a given application may be selected from those specified above depending on the optimum characteristics to be attained in the resulting composite, such as strength-per-weight, stiffness-per-weight, high temperature performance or toughness, among others.

Before the SiC reinforcement is coated with the ternary boride outer coating, an interface coating of carbon or boron nitride may be deposited on the SiC reinforcement. This interface coating is between about 1 and 5 microns thick and may be deposited by conventional vapor deposition methods.

Figure 1:
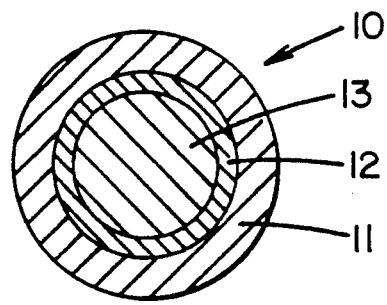
FIG. 1 represents a cross-section of a coated SiC reinforcement fiber having an interface coating between the SiC fiber and the outer ternary boride coating.

The ternary boride coating, as described herein, can be deposited by any conventionally known deposition methods including chemical vapor deposition, sol-gel, physical vapor deposition, and sputtering. The outer coating should be deposited in a layer that is from about 0.1 microns to about 5 microns thick. FIG. 1 is a cross-section of a coated reinforcement material 10 wherein a SiC reinforcement fiber 13 has been coated with a ternary boride outer coating 11 as described herein. An interface coating 12 is interposed between the SiC fiber 13 and the ternary boride outer coating 11.

It may be advantageous, depending on the end use of the material, to form the reinforcement by depositing SiC on a core material which possesses a very high melting point, prior to deposition of the subject coating. Such core material would typically be carbon or a refractory metal, such as W, Mo or Ti, among others, each of which is commercially available, such as those available from Stackpole Fibers Company and Alfa Inorganics.

Figure 2:
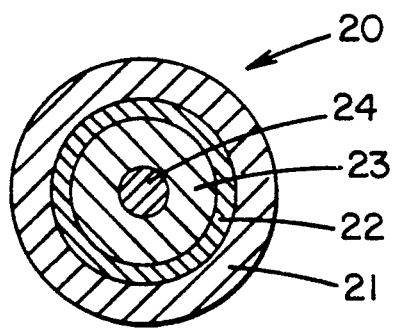
FIG. 2 represents a cross-section of a coated SiC fiber having a core of a different composition.

FIG. 2 is a cross-section of a coated reinforcement material 20, having a core 24, coated with a SiC layer 23, which layer is externally coated with an interface coating 22. The interface coating 22 is then coated with the ternary boride outer coating 21 as described herein.

Figure 3:
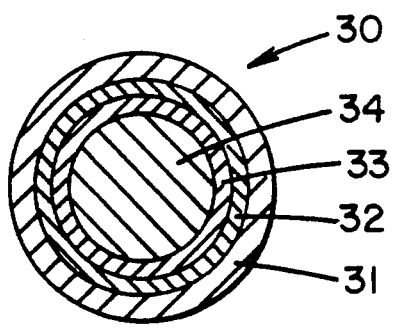
FIG. 3 represents a cross-section of a coated SiC reinforcement fiber having an interface coating between the SiC fiber and the inner boride coating. The inner boride coating is interposed between the interface coating and the outer ternary boride coating.

In another embodiment of the present invention, an additional coating is interposed between the C or BN interface coating and the ternary boride outer coating. This additional, or inner boride coating, is of the general formula:

$$Ti_aM'_bB_c$$

wherein M' is at least one of Zr and Hf; a is between about 20 and 45 atomic percent; b is between about 0 and 10 atomic percent; c is between about 55 and 90 atomic percent; and a+b+c=100. Preferably, c is between about 60 and 70 atomic percent; FIG. 3 is a cross-section of a coated reinforcement material 30, wherein a SiC reinforcement fiber 34, which has been coated with a BN or C interfaces 33, is then coated on its outside surface with an inner boride coating 32, followed by coating with the ternary boride outer coating 31.

The inner boride coating, as herein described, is deposited on the interface coating by conventional deposition methods including chemical vapor deposition, sol-gel, physical vapor deposition, and sputtering. The thickness of the inner boride coating ranges from about 0.1 microns to about 5 microns thick.

Prior to coating any of the SiC reinforcements described above, the reinforcement may be pretreated to enhance the adherence of the coating to the reinforcement, and the smoothness of the reinforcement-coating interface. Such pretreatment processes may also include chemical etching, ion etching, flame polishing and mechanical polishing, among others.

Suitable matrix materials into which reinforcements coated according to this disclosure are to be incorporated include titanium alloys, and preferably cubic, or beta, titanium alloys. The beta titanium alloys of the present invention comprise at least 25 vol. % beta titanium. Examples of such alloys include Ti-40V, ti-15Nb, Ti-15V-3Cr-3Sn-3Al, Ti-30Mo, and TI-25Nb-25Al. Matrix materials may be obtained commercially in the form of powders or foils, or may be formulated by arc melting, casting, hot pressing or other known techniques.

The coated reinforcements are combined with the matrix material by any of a number of methods and techniques known to those skilled in the art, such as hot pressing or melt infiltration, among others.

EXAMPLES

The following experimentation was conducted to demonstrate the stability of ternary boride coated SiC reinforcements at elevated temperatures. The samples prepared and tested in the following examples were of the structure:

matrix/coating/reinforcement wherein coating refers to the ternary boride outer coating, the inner boride coating and the interface coating, if any, as well as comparative coatings. Matrx, for purposes of these examples, refers to an arc-melted Ti alloy that has been finely polished. The coating and reinforcement layers were applied tot he matrix using magnetron sputtering and a commercial S-gun arrangement. The reinforcement was sputtered SiC.

A typical procedure was to mount the polished matrix in a cryopumped (base pressure $2 \times 10^{-7}$ torr) vacuum chamber on a sample holder that rotated about the sputter gun to insure an even coverage of the coating.

One S-gun was used to deposit the coating layer (0.1 to 1.0 microns) while the reinforcement (0.1 to 100 microns) could be deposited using the other S-gun, thus avoiding the need to break the vacuum between the deposition of the two layers. The sputtering was performed in an argon atmosphere, at a pressure of 1.5 mtorr.

The foregoing process produced smooth, dense, adherent coatings. The thickness of the coating and the reinforcement were determined by a TM-100 thickness monitor in the vacuum chamber.

Following deposition, the samples were tested by exposure at temperatures ranging from 500° to 900° C. in a sealed fused silica tube. Table I reports the extent of reaction for various samples prepared as described herein. As can be seen, those samples in which the SiC reinforcement has been coated with a ternary boride coating according to the subject invention 1 through 11 experienced slight or no reaction between the coating and matrix compared to the comparative samples which did not contain ternary boride coated SiC reinforcements (A-D and F-G). Sample E, which was not stable, did not contain enough boron in the ternary boride coating to provide the desired effect.

TABLE I

| Sample | Coating | Matrix | Heat Treatment | Result |
|---|---|---|---|---|
| A | $Ti_{50}B_{50}$ | Ti-15V-3Cr-3Al-3Sn | 700° C./24 hrs | reacted |
| B | $Ti_{33}B_{67}$ | Ti-15V-3Cr-3Al-3Sn | 700° C./24 hrs | reacted |
| C | carbon | Ti-15V-3Cr-3Al-3Sn | 700° C./24 hrs | reacted |
| D | SiC | Ti-15V-3Cr-3Al-3Sn | 700° C./24 hrs | reacted |
| E | $Ti_{70}V_{17}B_{13}$ | Ti-15V-3Cr-3Al-3Sn | 700° C./24 hrs | reacted |
| F | $Ti_{50}B_{50}$ | Ti-25Nb-25Al | 700° C./24 hrs | reacted |
| G | TiC | Ti-15V-3Cr-3Al-3Sn | 700° C./24 hrs | reacted |
| 1 | $Ti_{50}V_{10}B_{40}$ | Ti-15V-3Cr-3Sn-3Al | 700° C./50 hrs | stable |
| 2 | $Ti_{43}V_{12}B_{45}$ | Ti-15V-3Cr-3Sn-3Al | 700° C./50 hrs | stable |
| 3 | $Ti_{43}Mo_{17}B_{40}$ | Ti-15V-3Cr-3Sn-3Al | 700° C./50 hrs | stable |
| 4 | $Ti_{50}Mo_{20}B_{30}$ | Ti-30Mo | 700° C./50 hrs | stable |
| 5 | $Ti_{40}V_{10}B_{50}$ | Ti-15V-3Cr-3Al-3Sn | 800° C./72 hrs | stable |
| 6 | $Ti_{40}V_{10}B_{50}$ | Ti-30Mo | 800° C./72 hrs | stable |
| 7 | $Ti_{32}Ta_{10}V_2B_{54}$ | Ti-15V-3Cr-3Sn-3Al | 800° C./48 hrs | stable |
| 8 | $Ti_{32}Ta_{10}V_2B_{54}$ | Ti-15Nb | 800° C./48 hrs | stable |
| 9 | $Ti_{29}V_5Mo_{12}B_{54}$ | Ti-15Nb | 900° C./24 hrs | stable |
| 10 | $Ti_{40}V_{10}B_{40}$ | Ti-40V | 800° C./48 hrs | stable |
| 11 | $Ti_{29}V_5Mo_{12}B_{54}$ | Ti-15V-3Cr-3Sn-3Al | 900° C./24 hrs | stable |

X-ray Photoelectron Spectroscopy (XPS) was used to determine the extent of reaction between the coatings and the various matrix materials. The XPS spectra were acquired on a PHI 5400 XPS instrument using 300 watt Mg Kα x-rays, 1 mm diameter spot size, and 35.75 pass energy. Survey spectra were taken so that all surface components could be identified and higher resolution narrow region scans could then be obtained. The pressure in the main analysis chamber was in the $10^{-10}$ torr range.

XPS depth profiles were taken of the samples with and without the heat treatment. Of primary importance to the question of stability of the matrix/coating/reinforcement combination is the diffusion of boron from the coating into the matrix. A measure of the effectiveness of the coating is the amount of boron observed in the matrix following the heat treatment.

Table II reports the ratio $(B_m/B_c)$ of the boron content approximately 0.1 microns into the matrix to the boron contact in the coating. Ratios significantly higher than about 0.10 indicate unacceptable diffusion of boron into the matrix and a failure of the coating material. Ratios near 0.0 indicate excellent performance, minimal or no boron diffusion, and correspond to stable composite properties. As Table II shows, only the samples with ternary boride coating of the present invention (1, 3, 5-7, 9-11) demonstrate little or no boron diffusion at elevated temperatures. The composite of Example 5 is within acceptable limits.

TABLE II

| Sample | Coating | Matrix | Heat Treatment | Result |
|---|---|---|---|---|
| A | $Ti_{50}B_{50}$ | Ti-15V-3Cr-3Sn-3Al | 700° C./24 hrs. | 0.18 |
| E | $Ti_{70}V_{17}B_{13}$ | Ti-15V-3Cr-3Al-3Sn | 700° C./24 hrs. | 0.35 |
| F | $Ti_{50}B_{50}$ | Ti-25Nb-25Al | 700° C./24 hrs. | 0.32 |
| 1 | $Ti_{50}V_{10}B_{40}$ | Ti-15V-3Cr-3Sn-3Al | 700° C./50 hrs. | 0.00 |
| 3 | $Ti_{43}Mo_7B_{40}$ | Ti-15V-3Cr-3Sn-3Al | 700° C./50 hrs. | 0.00 |
| 5 | $Ti_{40}V_{10}B_{50}$ | Ti-15V-3Cr-3Sn-3Al | 800° C./72 hrs. | 0.12 |
| 6 | $Ti_{40}V_{10}B_{50}$ | Ti-30Mo | 800° C./72 hrs. | 0.00 |
| 7 | $Ti_{32}Ta_{10}V_2B_{54}$ | Ti-15V-3Cr-3Sn-3Al | 800° C./48 hrs. | 0.09 |
| 9 | $Ti_{29}V_5Mo_{12}B_{54}$ | Ti-15Nb | 900° C./24 hrs. | 0.00 |
| 10 | $Ti_{40}V_{10}B_{50}$ | Ti-40V | 800° C./48 hrs. | 0.00 |
| 11 | $Ti_{29}V_5Mo_{12}B_{54}$ | Ti-15V-3Cr-3Sn-3Al | 900° C./24 hrs. | 0.00 |

Composites were also fabricated by sputtering coatings and matrix materials onto SiC fibers. In these samples, high strength SM 1040 SiC fibers from British Petroleum were first coated with carbon as an interface layer using a chemical vapor deposition process and then coated by rf sputtering, as previously described, with coatings and matrix materials. Typical coating thickness was 0.2 to 0.5 microns. These composites were then heat treated at 800° C. for 48 hours in vacuum sealed fused silica tubes. Table III shows the results of these composites. The sample which did not contain a ternary boride coating according to the present invention (Sample H), was not stable.

TABLE III

| Sample | Fiber | Coating | Matrix | Result |
|---|---|---|---|---|
| H | SM 1040 | carbon | Ti-40V | reacted |
| 12 | SM 1040 | $C/Ti_{40}V_{10}B_{50}$ | Ti-40V | stable |
| 13 | SM 1040 | $C/Ti_{29}V_5Mo_{12}B_{54}$ | Ti-40V | stable |

Composites having both an inner and outer boride coating as depicted in FIG. 3, were fabricated by sputtering coatings and matrix materials onto SM 1040 SiC fibers from British Petroleum. The fibers were first coated with carbon as an interface layer and then coated, with a inner boride coating and then an outer boride coating by rf sputtering. Typical coating thickness was about 0.5 to 1.0 microns. The composites were then heated treated in vacuum sealed fused silica tubes for 48 hours at 800° C. A Scanning Auger Microprobe (SAM) was used to analyze the composites. Table IV shows the results for these composites. The inner boride coating along, was not sufficient to prevent the matrix from reacting with the fiber as shown by sample J. The use of multilayer coatings prevent the matrix from reacting with the SiC monofilament or the carbon interface layer surrounding the SiC monofilament. Thus, this combination of coatings provides maximum stability and enables use at higher temperatures for SiC reinforcements in titanium matrix composites.

TABLE IV

| Sample | Fiber | Coating | Matrix | Heat Treatment | Result |
|---|---|---|---|---|---|
| I | SM 1040 | Carbon | Ti-40V | 800° C./ 48 hrs | Reacted |
| J | SM 1040 | Carbon/Ti$_{14}$B$_{86}$ | Ti-40V | 800° C./ 48 hrs | Reacted |
| 14 | SM 1040 | Carbon/Ti$_{14}$B$_{86}$/ Ti$_{30}$V$_{20}$B$_{50}$ | Ti-40V | 800° C./ 48 hrs | Stable |

The foregoing examples are not intended to limit the subject invention, the breadth of which is defined by the specification and the claims appended hereto, but are presented rather to aid those skilled in the art to clearly understand the invention defined herein.

What we claim is:

1. A coated reinforcement material comprising:
   a reinforcement having a coefficient of thermal expansion ranging from about $3 \times 10^{-6}/°$ C. to about $12 \times 10^{-6}/°$ C.; and
   a boride outer coating deposited on said reinforcement having of the formula:

$Ti_xM_yB_z$ wherein M is at least one of V, Nb, Ta, Cr, Mo, W, Zr and Hf; x is between about 30 and 60 atomic percent; y is between about 5 and 30 atomic percent; z is between about 35 and 60 atomic percent; and $x+y+z=100$.

2. A coated reinforcement material as in claim 1 wherein said reinforcement comprises SiC.

3. A coated reinforcement material as in claim 1 further comprising an interface coating selected from the group consisting of carbon and boron nitride interposed between said reinforcement and said outer coating and adjacent to said reinforcement.

4. A coated reinforcement material as in claim 3 further comprising an inner coating interposed between said interface coating and said outer coating and adjacent to said outer coating, said inner coating having the general formula:

$Ti_aM'_bB_c$ wherein M' is at least one of Zr and Hf; a is between about 20 and 45 atomic percent; b is between about 0 and 10 atomic percent; c is between about 55 and 90 atomic percent; and $a+b+c=100$.

5. A coated reinforcement material as in claim 4 wherein c is between about 60 and 70 atomic percent.

6. A coated reinforcement material as in claim 1 wherein said outer coating is deposited by a vapor deposition process.

7. A coated reinforcement material as in claim 1 wherein said outer coating is from about 0.1 microns to abuot 5 microns thick.

8. A coated reinforcement material as in claim 1 wherein said reinforcement is amorphous.

9. A coated reinforcement material as in claim 1 wherein said reinforcement is polycrystalline.

10. A coated reinforcement material as in claim 1 wherein said reinforcement is a single crystal.

11. A coated reinforcement material as in claim 2 wherein said reinforcement is pretreated by a process selected from the group consisting of chemical etching, ion etching, flame polishing and mechanical polishing prior to the addition of said outer coating to said SiC reinforcement.

12. A coated reinforcement material comprising:
    a core material;
    a first coating deposited on said core having a coefficient of thermal expansion ranging from about $3 \times 10^{-6}/°$ C. to about $12 \times 10^{-6}/°$ C.; and
    a boride second coating deposited on said first coating having the formula:

$Ti_xM_yB_z$ wherein M is at least one of V, Nb, Ta, Cr, Mo, W, Zr, and Hf; x is between about 30 and 60 atomic percent; y is between about 5 and 30 atomic percent; z is between about 35 and 60 atomic percent; and $x+y+z=100$.

13. A coated reinforcement material as in claim 12 wherein said core material is selected from the group consisting of C, W, Mo and Ti.

14. A coated reinforcement material as in claim 1 wherein said reinforcement is selected from the group consisting of fibers, whiskers and monofilaments.

15. A coated reinforcement material as in claim 3 wherein said interface coating is deposited by a vapor deposition process.

16. A coated reinforcement material as in claim 3 wherein said interface coating is from about 1 micron to about 5 microns thick.

17. A coated reinforcement material as in claim 4 wherein said inner coating is deposited by a vapor deposition process.

18. A coated reinforcement material as in claim 4 wherein said inner coating is from about 0.1 to about 5 microns thick.

19. A reinforced composite comprising:
    a coated reinforcement material comprising a reinforcement having a coefficient of thermal expansion ranging from about $3 \times 10^{-6}/°$ C. to about $12 \times 10^{-6}/°$ C. and having an outer coating comprising a boride having the formula:

$Ti_xM_yB_z$ wherein M is at least one of V, Nb, Ta, Cr, Mo, W, Zr and Hf; x is between about 30 and 60 atomic percent; y is between about 5 and 30 atomic percent; z is between about 35 and 60 atomic percent; and $x+y+z=100$; and
    a matrix material into which said coated reinforcement material is incorporated.

20. A composite as in claim 19 wherein said matrix material comprises a titanium alloy having at least a titanium component and second component.

21. A composite as in claim 20 wherein said matrix material comprises a titanium alloy having at least 25 volume % cubic titanium.

22. A composite as is claim 19 wherein said coated reinforcement material further comprises an interface coating selected from the group consisting of carbon and boron nitride interposed between said reinforcement and said outer coating and adjacent to said reinforcement.

23. A composite as in claim 2 wherein said coated reinforcement material further comprises an inner coating interposed between said interface coating and said outer coating and adjacent to said outer coating, said inner coating having the general formula:

$$Ti_a M'_b B_c$$

wherein M' is at least one of Zr and Hf; a is between about 20 and 44 atomic percent; b is between about 0 and 10 atomic percent; c is between about 55 and 90 atomic percent; and $a+b+c=100$.

24. A composite as in claim 20 wherein M is said second component of said titanium alloy of said matrix material.

25. A composite as in claim 19 wherein said reinforcement is selected from the group consisting of fibers, whiskers and monofilaments.

26. A high strength, high temperature performance composite as in claim 19 wherein said reinforcement comprises SiC.

* * * * *

UNITED STATES PATENT AND TRADEMARK OFFICE
CERTIFICATE OF CORRECTION

PATENT NO. : 5,227,249
DATED : July 13, 1993
INVENTOR(S) : M.A. Tenhover; D. Lukco It is certified that error appears in the above-identified patent and that said Letters Patent is hereby corrected as shown below:

Column 9, line 16, "claim 2" should read "claim 22".

Signed and Sealed this

Twenty-ninth Day of March, 1994

Attest:

BRUCE LEHMAN

Attesting Officer     Commissioner of Patents and Trademarks